(12) United States Patent
Sinharoy

(10) Patent No.: US 6,766,441 B2
(45) Date of Patent: Jul. 20, 2004

(54) PREFETCHING INSTRUCTIONS IN MIS-PREDICTED PATH FOR LOW CONFIDENCE BRANCHES

(75) Inventor: Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 09/765,163

(22) Filed: Jan. 19, 2001

(65) Prior Publication Data

US 2002/0099926 A1 Jul. 25, 2002

(51) Int. Cl.[7] .............................................. G06F 9/38
(52) U.S. Cl. ...................... 712/237; 712/207; 712/239
(58) Field of Search ................................ 712/207, 239, 712/237

(56) References Cited

U.S. PATENT DOCUMENTS 5,860,017 A * 1/1999 Sharangpani et al. ......... 712/23
5,933,628 A * 8/1999 Chang ......................... 712/233
6,092,187 A * 7/2000 Killian ......................... 712/239
6,341,348 B1 * 1/2002 Tremblay ..................... 712/239

* cited by examiner

Primary Examiner—Kenneth S. Kim
(74) Attorney, Agent, or Firm—Sawyer Law Group LLP

(57) ABSTRACT

In a first aspect of the present invention, a method for prefetching instructions in a superscalar processor is disclosed. The method comprises the steps of fetching a set of instructions along a predicted path and prefetching a predetermined number of instructions if a low confidence branch is fetched and storing the predetermined number of instructions in a prefetch buffer. In a second aspect of the present invention, a system for prefetching instructions in a superscalar processor is disclosed. The system comprises a cache for fetching a set of instructions along a predicted path, a prefetching mechanism coupled to the cache for prefetching a predetermined number of instructions if a low confidence branch is fetched and a prefetch buffer coupled to the prefetching mechanism for storing the predetermined number of instructions. Through the use of the method and system in accordance with the present invention, existing prefetching algorithms are improved with minimal additional hardware cost.

21 Claims, 3 Drawing Sheets

PREFETCHING INSTRUCTIONS IN MIS-PREDICTED PATH FOR LOW CONFIDENCE BRANCHES

FIELD OF THE INVENTION

The present invention relates generally to superscalar processors and more particularly to a method and system for prefetching instructions in such a processor.

BACKGROUND OF THE INVENTION

Instruction prefetching has been analyzed in great details over the years. Many of the proposed approaches require the keeping of a large table that indicates what cache line to prefetch when a particular address is being fetched. In highly speculative superscalar processors, instructions are prefetched from a path predicted by a branch prediction algorithm.

To reduce memory access time, a memory subsystem is usually organized within the processor with multiple cache levels. In the memory hierarchy, the first level cache is the fastest but it is also the smallest in size. For instruction accesses, most microprocessors have a dedicated first level cache, called an instruction cache (IL1 cache). During execution, the IL1 cache is usually accessed at every cycle with a very short access time (1 cycle in most processors).

Furthermore, optimization tools such as Feedback Directed Program Restructuring, (FDPR) restructures programs so that the most frequent paths of execution are laid out in the memory in sequential cache lines. This gives rise to the successful use of a simple instruction prefetching algorithm called Next Sequential Address (NSA). In this algorithm on an IL1 miss, the demand line is fetched with high priority and the next one (or more) sequential lines are "prefetched" with lower priority. Also, on a hit in the prefetch buffer, the next sequential line is prefetched. To prevent pollution of the IL1 cache with prefetched lines (since the prefetched lines may not be actually needed), the prefetched lines are stored in a separate area, called the "prefetch buffer". Furthermore, to reduce memory traffic, before sending a prefetch request to the memory subsystem below IL1, the IL1 cache directory and the prefetch buffer is checked to see if the cache line already exists.

Since the IL1 cache is usually small (often no more than 64 KB), significant IL1 cache misses occur for most workloads. On a IL1 cache miss, the execution pipeline is usually dry and the line is brought in from a lower level of the memory hierarchy with a much longer access time (for example, if the line is found in a lower level cache, the access time may be about 10 cycles). Consequently, IL1 cache misses are undesirable due to cache miss latency or the amount of time required to bring the line in from a lower level of the memory hierarchy.

Accordingly, what is needed is an improved method and system for prefetching instructions in a superscalar processor. The method and system should be simple, cost effective and capable of being easily adapted to current technology. The present invention addresses such a need.

SUMMARY OF THE INVENTION

In a first aspect of the present invention, a method for prefetching instructions in a superscalar processor is disclosed. The method comprises the steps of fetching a set of instructions along a predicted path and prefetching a predetermined number of instructions if a low confidence branch is fetched and storing the predetermined number of instructions in a prefetch buffer.

In a second aspect of the present invention, a system for prefetching instructions in a superscalar processor is disclosed. The system comprises a cache for fetching a set of instructions along a predicted path, a prefetching mechanism coupled to the cache for prefetching a predetermined number of instructions if a low confidence branch is fetched and a prefetch buffer coupled to the prefetching mechanism for storing the predetermined number of instructions.

Through the use of the method and system in accordance with the present invention, existing prefetching algorithms are improved with minimal additional hardware cost.

DETAILED DESCRIPTION

The present invention relates to an improved method and system for prefetching instructions in a superscalar processor. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is present in the context of a preferred embodiment. The preferred embodiment of the present invention is a method and system for prefetching instructions in a superscalar processor. The method and system in accordance with the present invention prefetches instructions from the branches that are "difficult to predict" by a branch prediction algorithm. Most importantly, the method and system in accordance with the present invention prefetches cache lines that are needed after the misprediction of a difficult to predict branch. Accordingly, when a difficult to predict branch mispredicts, the needed cache lines are retrieved from the prefetch buffer, thus avoiding cache miss latency.

Figure 1:
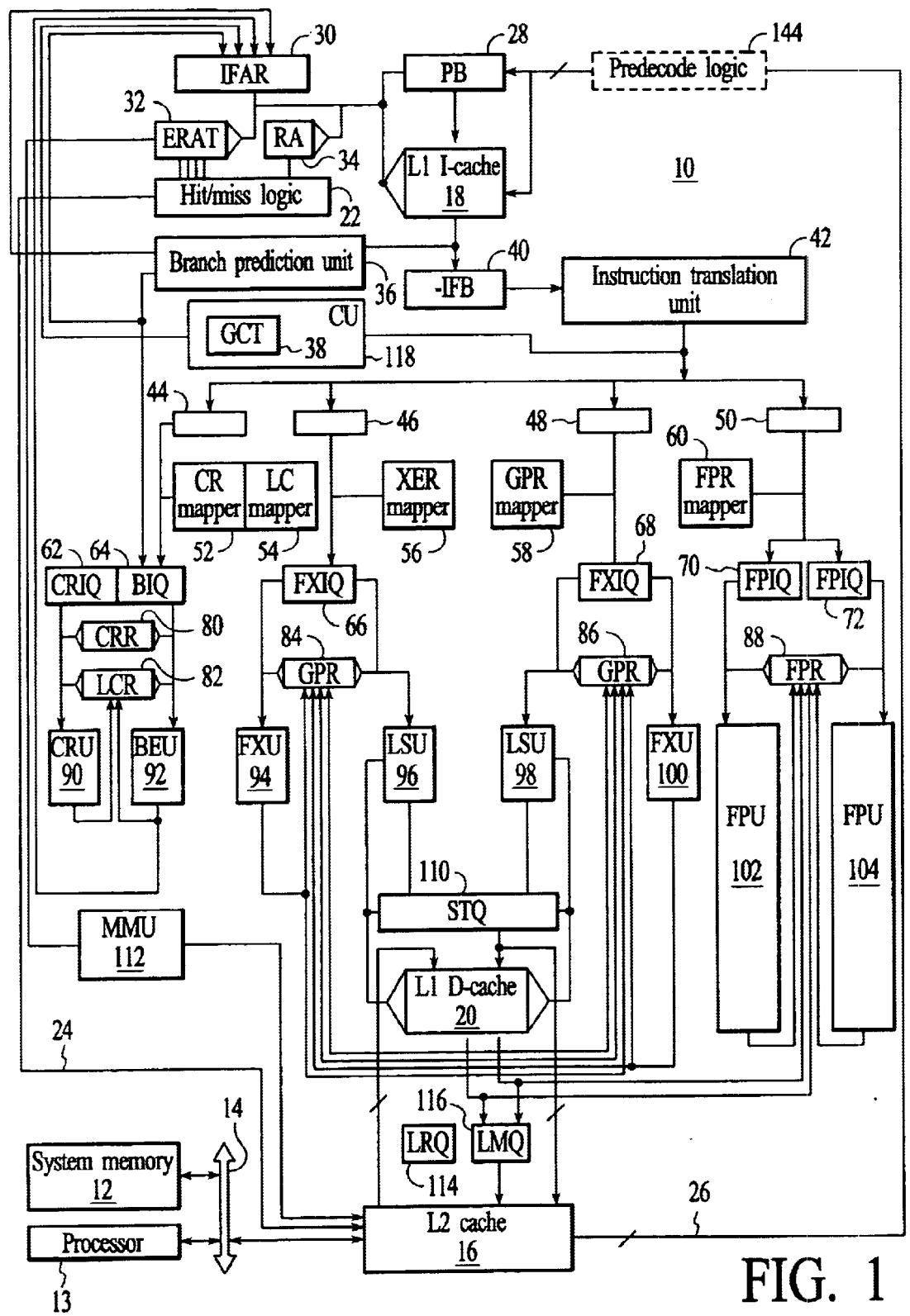
FIG. 1 is a high level block diagram of an illustrative embodiment of a processor for processing instructions and data in accordance with the present invention.

Please refer now to FIG. 1. FIG. 1 is a high level block diagram of an illustrative embodiment of a processor, generally designated 10, for processing instructions and data in accordance with the present invention. Processor 10 comprises a single integrated circuit superscalar processor, which, as discussed further below, includes various execution units, registers, buffers, memories, and other functional units that are all formed by integrated circuitry. As illustrated in FIG. 1, processor 10 may be coupled to other devices, such as a system memory 12 and a second processor 13, by an interconnect fabric 14 to form a larger data processing system such as computer system.

Processor 10 has an on-chip multi-level cache hierarchy including a unified level two (L2) cache 16 and bifurcated level one (L1) instruction (I) and data (D) caches 18 and 20, respectively. As is well known to those skilled in the art, caches 16, 18 and 20 provide low latency access to cache lines corresponding to memory locations in system memory 12.

Instructions are fetched for processing from L1 I-cache 18 in response to the effective address (EA) residing in instruction fetch address register (IFAR) 30. During each cycle, a new instruction fetch address may be loaded into IFAR 30 from one of three sources: branch prediction unit (BPU) 36, which provides speculative path addresses resulting from the prediction of conditional branch instructions, group completion table (GCT) 38, in completion unit (CU) 118 which provides non-speculative path addresses, and branch execution unit (BEU) 92, which provides non-speculative addresses resulting from the resolution of incorrectly predicted conditional branch instructions. If hit/miss logic 22 determines, after translation of the EA contained in IFAR 30 by effective-to-real address translation (ERAT) 32 and lookup of the real address (RA) in I-cache directory 34, that the cache line of instructions corresponding to the EA in IFAR 30 does not reside in L1 I-cache 18, then hit/miss logic 22 provides the RA to L2 cache 16 as a request address via I-cache request bus 24. Such request addresses may also be generated by prefetch logic within L2 cache 16 based upon recent access patterns. In response to a request address, L2 cache 16 outputs a cache line of instructions, which are loaded into prefetch buffer (PB) 28 and L1 I-cache reload bus 26, possibly after passing through optional predecode logic 144.

Once the cache line specified by the EA in IFAR 30 resides in L1 cache 18, L1 I-cache 18 outputs the cache line to both branch prediction unit (BPU) 36 and to instruction fetch buffer (IFB) 40. BPU 36 scans the cache line of instructions for branch instructions and predicts the outcome of conditional branch instructions, if any. Following a branch prediction, BPU 36 furnishes a speculative instruction fetch address to IFAR 30, as discussed above, and passes the prediction to branch instruction queue 64 so that the accuracy of the prediction can be determined when the conditional branch instruction is subsequently resolved by branch execution unit 92.

IFB 40 temporarily buffers the cache line of instructions received from L1 I-cache 18 until the cache line of instructions can be translated by instruction translation unit (ITU) 42. In the illustrated embodiment of processor 10, ITU 42 translates instructions from user instruction set architecture (UISA) instructions into a possibly different number of internal ISA (IISA) instructions that are directly executable by the execution units of processor 10. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by group completion table 38 to an instruction group, the members of which are permitted to be dispatched and executed out-of-order with respect to one another. Group completion table 38 tracks each instruction group for which execution has yet to be completed by at least one associated EA, which is preferably the EA of the oldest instruction in the instruction group.

Following UISA-to-IISA instruction translation, instructions are dispatched to one of latches 44, 46, 48 and 50, possibly out-of-order, based upon instruction types. That is, branch instructions and other condition register (CR) modifying instructions are dispatched to latch 44, fixed-point and load-store instructions are dispatched to either of latches 46 and 48, and floating-point instructions are dispatched to latch 50. Each instruction requiring a rename register for temporarily storing execution results is then assigned one or more rename registers by the appropriate one of CR mapper 52, link and count (LC) register mapper 54, exception register (XER) mapper 56, general-purpose register (GPR) mapper 58, and floating-point register (FPR) mapper 60.

The dispatched instructions are then temporarily placed in an appropriate one of CR issue queue (CRIQ) 62, branch issue queue (BIQ) 64, fixed-point issue queues (FXIQs) 66 and 68, and floating-point issue queues (FPIQs) 70 and 72. From issue queues 62, 64, 66, 68, 70 and 72, instructions can be issued opportunistically to the execution units of processor 10 for execution as long as data dependencies and antidependencies are observed. The instructions, however, are maintained in issue queues 62–72 until execution of the instructions is complete and the result data, if any, are written back, in case any of the instructions needs to be reissued.

As illustrated, the execution units of processor 10 include a CR unit (CRU) 90 for executing CR-modifying instructions, a branch execution unit (BEU) 92 for executing branch instructions, two fixed-point units (FXUs) 94 and 100 for executing fixed-point instructions, two load-store units (LSUs) 96 and 98 for executing load and store instructions, and two floating-point units (FPUs) 102 and 104 for executing floating-point instructions. Each of execution units 90–104 is preferably implemented as an execution pipeline having a number of pipeline stages.

During execution within one of execution units 90–104, an instruction receives operands, if any, from one or more architected and/or rename registers within a register file coupled to the execution unit. When executing CR-modifying or CR-dependent instructions, CRU 90 and BEU 92 access the CR register file 80, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater zero, or equal to zero. Link and count register (LCR) register file 82 contains a count register (CTR), a link register (LR) and rename registers of each, by which BEU 92 may also resolve conditional branches to obtain a path address. General-purpose register files (GPRs) 84 and 86, which are synchronized, duplicate register files, store fixed-point and integer values accessed and produced by FXUs 94 and 100 and LSUs 96 and 98. Floating-point register file (FPR) 88, which like GPRs 84 and 86 may also be implemented as duplicate sets of synchronized registers, contains floating-point values that result from the execution of floating-point instructions by FPUs 102 and 104 and floating-point load instructions by LSUs 96 and 98.

After an execution unit finishes execution of an instruction, the execution unit writes the result to the designated destination as specified by the instruction, removes the instruction from the issue queue, notifies CU 118, which schedules completion of instructions in program order. To complete an instruction executed by one of CRU 90, FXUs 94 and 100 or FPUs 102 and 104, CU 118 signals the execution unit, which writes back the result data, if any, from the assigned rename register(s) to one or more architected registers within the appropriate register file. Once all instructions within its instruction group have completed, it is removed from GCT 38. Other types of instructions, however, are completed differently.

When BEU 92 resolves a conditional branch instruction and determines the path address of the execution path that should be taken, the path address is compared against the speculative path address predicted by BPU 36. If the path addresses match, no further processing is required. If, however, the calculated path address does not match the predicted path address, BEU 92 supplies the correct path address to IFAR 30. In either event, the branch instruction can then be removed from BIQ 64, and when all other instructions within the same instruction group have completed, from GCT 38.

Following execution of a load instruction, the effective address computed by executing the load instruction is translated to a real address by a data ERAT (not illustrated) and then provided to L1 D-cache 20 as a request address. At this point, the load instruction is removed from FXIQ 66 or 68 and placed in load reorder queue (LRQ) 114 until the indicated load is performed. If the request address misses in L1 D-cache 20, the request address is placed in load miss queue (LMQ) 116, from which the requested data is retrieved from L2 cache 16, and failing that, from another processor 13 or from system memory 12. LRQ 114 snoops exclusive access requests (e.g., read-with-intent-to-modify), flushes or kills on interconnect fabric 14 against loads in flight, and if a hit occurs, cancels and reissues the load instruction.

Store instructions are similarly completed utilizing a store queue (STQ) 110 into which effective addresses for stores are loaded following execution of the store instructions. From STQ 110, data can be stored into either or both of L1 D-cache 20 and L2 cache 16.

As previously mentioned, the method and system in accordance with the present invention prefetches instructions from the branches that are "difficult to predict" by a branch prediction algorithm. Most importantly, the method and system in accordance with the present invention prefetches cache lines that are needed after the misprediction of a difficult to predict branch. Accordingly, when a difficult to predict branch mispredicts, the needed cache lines are retrieved from the prefetch buffer, thus avoiding cache miss latency.

Figure 2:
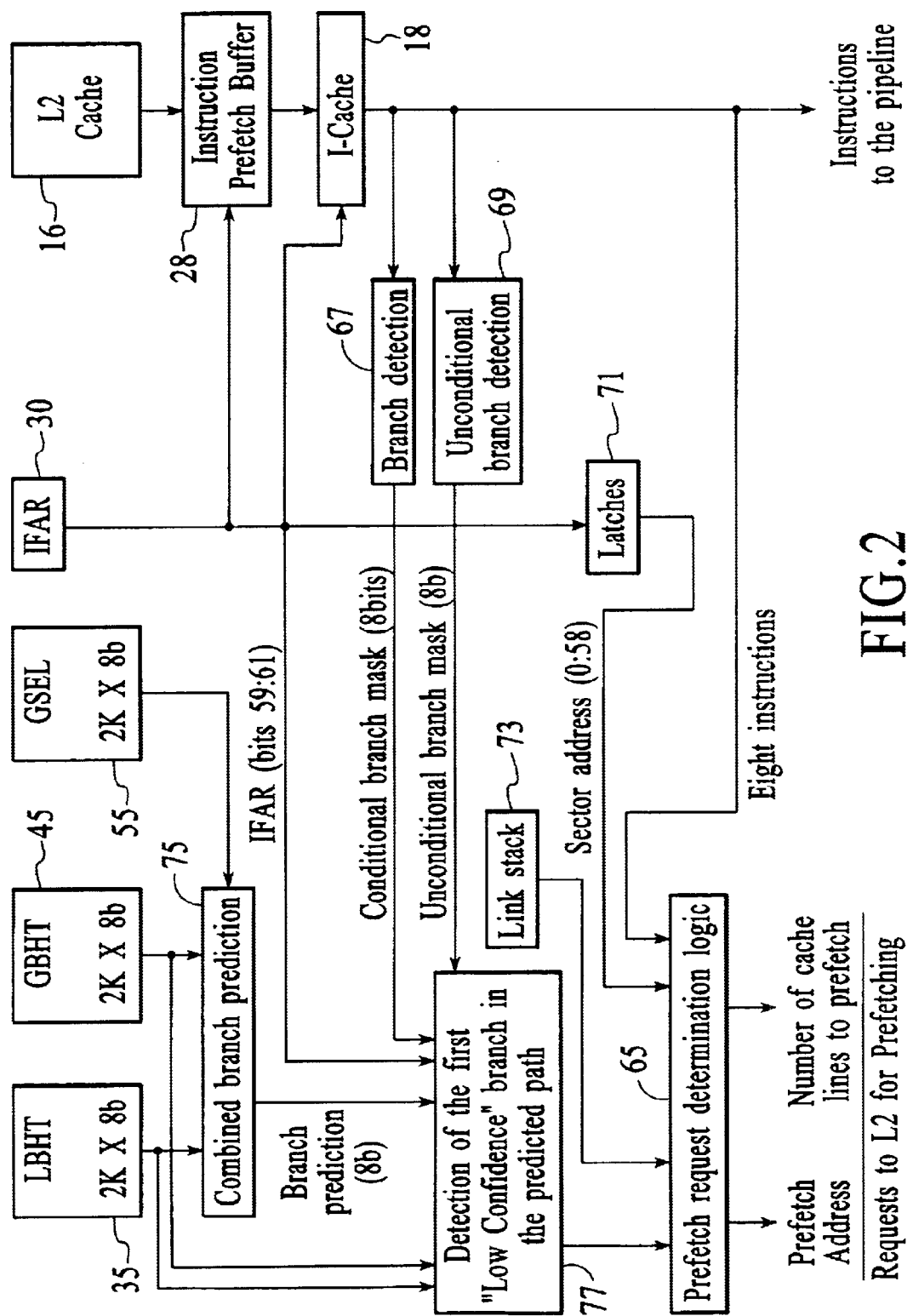
FIG. 2 is a simple block diagram of the prefetching mechanism of the present invention.

For a better understanding of the present invention, please refer now to FIG. 2. FIG. 2 is an illustration of the prefetch mechanism of a superscalar processing system in accordance with the present invention. It should be noted that elements shown in FIG. 2 that are common with FIG. 1 have the same reference numerals. Depicted in the illustration is the L2 Cache 16, the I-Cache 18, the Instruction Prefetch Buffer 28, the Instruction Fetch Address Register (IFAR) 30, a local branch history table (LBHT) 35, a global branch history table (GBHT) 45, a branch selector mechanism 55, and Prefetch Request Determination Logic 65. Each branch history table 35, 45 implements a branch prediction algorithm and are located in the branch prediction unit 36. The mechanism also includes a confidence detection mechanism. The confidence detection mechanism includes a branch detection block 67 and an unconditional branch detection block 69 which are coupled to the ICache 18. Each of the blocks 67 and 69 provide masks to a detection of the first low confidence branch in the predicted path block 77. Block 77 in turn provides a signal to the prefetch request determination block 65. The prefetch request determination block 65 also receives signals from a link stack block 73, latches 71 and the ICache 18. The latches 71 receive data from IFAR 30. The output of the prefetch determination request logic 65 is a prefetch address and the number of cache lines to prefetch.

The operation of these branch prediction mechanisms is described in more detail in U.S. patent application Ser. No. 09/435,070, entitled "Circuits, Systems and Methods for Performing Branch Predictions by Selectively Accessing Bimodal and Fetch-Based Branch Industry Tables" filed on Nov. 3, 1999, and assigned to the assignee of this application and incorporated by reference herein. Each of the arrays of LBHT 35 and GBHT 45 require 2K lines at a time (that is, they need 11-bits to index). In a preferred embodiment, each of the lines includes 8-bits. Eight instructions at a time come out of the ICache 18, each of which could be a conditional branch (in which case, we have predictions for each one of them). 8-bits from GSEL 55 determine which branch predictions out of the two methods should be used. If the GSEL 55 outcome is 11110000, then first four predictions are taken from GBHT 45 and the last four predictions are taken from the LBHT 35. If GBHT 45 outcome is 11100000 and the LBHT 35 outcome is 00001001, then the "Combined branch prediction" is 11101001. These are the 8-bits shown as "Branch Prediction (8b)" in the figure.

Also included in the branch prediction unit 36 is the branch selector mechanism 55. The IFAR 30 is used to index the I-Cache 18 and the Prefetch Buffer 28 and also helps in indexing the branch history tables 35, 45 and the branch selector mechanism 55. The Prefetch Request Determination Logic 65 implements the requests to prefetch and store instructions based on the branch predictions.

When instructions come out of the I-Cache 18 they are decoded to determine which one, if any, are conditional branches. In the ease of a conditional branch, if the condition is true, instructions from the target of the branch are executed. If the condition is not true, instructions from the sequential path of the branch are executed. At the time of fetching the branch instruction, the value of the condition is not usually known and needs tote predicted. A taken prediction indicates that the instruction fetch should occur from the target of the branch. A not-taken prediction means that the next sequential instructions should be fetched.

A typical branch prediction algorithm uses the two branch prediction algorithms employed by the two branch history tables 35, 45, to formulate a combined branch prediction 75. The branch selector mechanism 55 determines which elementary branch prediction algorithm should be used to make the final prediction for a particular branch. For a majority of the branches, the two branch prediction algorithms agree. However, trace-based analysis shows that the branches for which the two prediction algorithms disagree are the branches for which it is difficult to correctly predict whether the condition will be evaluated to "true" or "not true". These branches will be referred to here as "low confidence" branches.

In accordance with the prefetching algorithm of the present invention, a predetermined number of cache lines are prefetched and stored in the prefetch buffer 28 when a "low confidence" branch is fetched. By storing a predetermined number of cache lines in the prefetch buffer 28 when a "low confidence" branch is fetched, cache miss latency that occurs immediately following a branch misprediction is avoided since the cache lines that are needed after a branch misprediction, are already stored in the prefetch buffer 28.

A detection of the first "low confidence" branch is provided by the predicted path block 77. IFAR bits 59:61 indicates where in the sector the actual instructions start. When the "conditional branch mask" signal is ANDed with the "branch prediction" signal and then OR the result with the "unconditional branch mask" signal, an 8-bit vector is provided. If there is a 1 in this vector at or after the "actual instructions" start, then we have a taken branch in the predicted path and no other instructions after the position where the first 1 appeared are in the predicted path. For example, if IFAR (59:61)=001, then actual instructions start at position 2. If the "conditional branch mask" is 00100010, and the branch prediction is 00000111, then we have two conditional branches (in position $3^{rd}$ and $7^{th}$) and the branch in $3^{rd}$ position is predicted not-taken and in the $7^{th}$ position is predicted taken. If the "unconditional branch mask" is 00000001, then we have the final result after the AND and OR operation as 00000011. So the actual instructions (in the predicted path starts at position 1 and ends at position 7). So the vector representing the "actual instructions" is 01111110 (that is, instructions at position 1 through 7 are in the predicted path). The next problem is to determine if there is any conditional branch instructions among the actual instructions that is predicted with "low confidence".

Two 8-bit vectors come out of the LBHT 35 and GBHT 45 arrays, including branch predictions for two different methods. If the vectors differ in any of the positions, then a conditional branch in that position (if any) is considered to be predicted with "low confidence". In the above example, the vectors from LBHT 35, GBHT 45 and GSEL 55 arrays are: 00100111, 00000111 and 00111111. This makes the final "branch prediction" to be 00000111 (as mentioned before). Since the local and global predictions for the conditional branch in the third position differs, this branch is predicted to be "not-taken" with low confidence.

The information that there is a "low confidence" branch in the predicted path and its position is sent to the block "Prefetch request determination logic".

Figure 3:
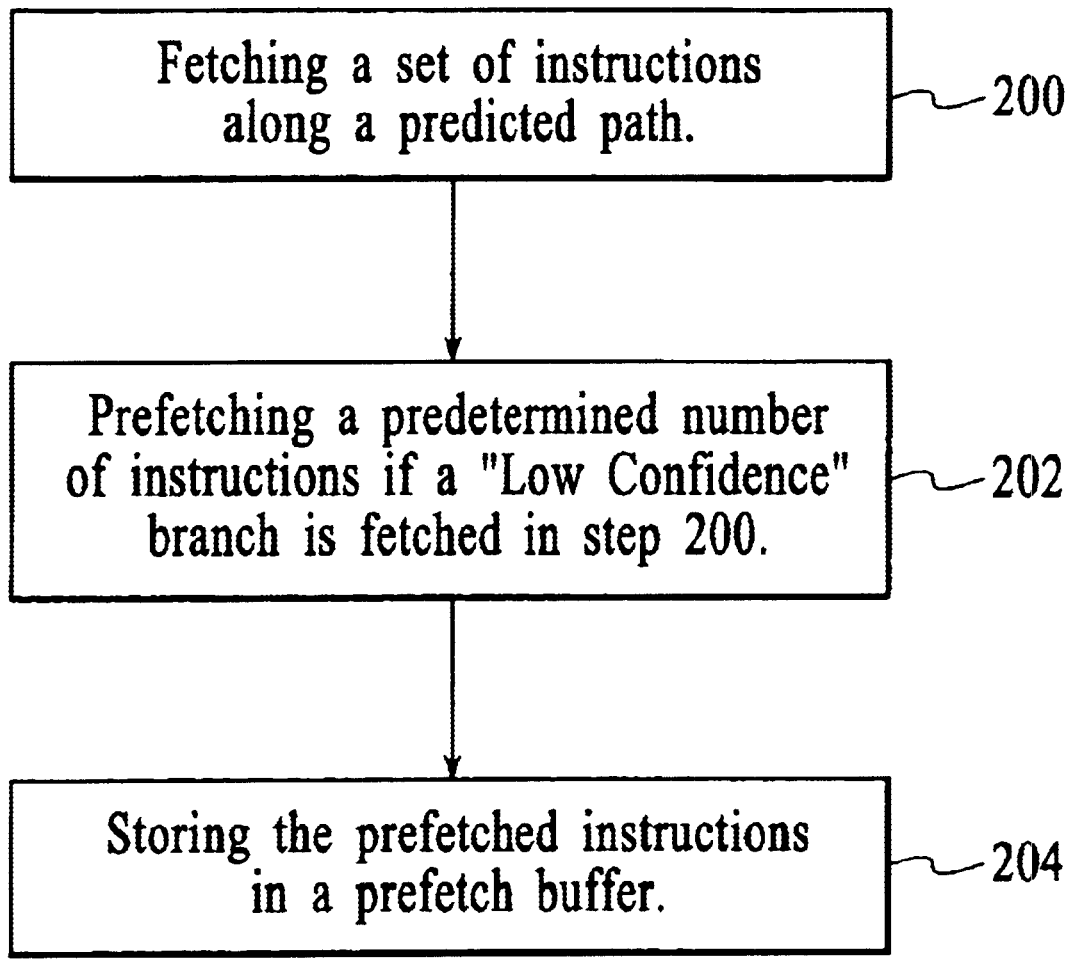
FIG. 3 is a flowchart of the method in accordance with the present invention.

To better understand the prefetching algorithm in accordance with the present invention, please refer to FIG. 3. FIG. 3 is a flowchart of the prefetching algorithm in accordance with the present invention. First, a set of instructions along a predicted path is fetched, via step 200. Preferably, the path is selected by the branch selector mechanism based on a combined branch prediction by the two branch history tables. Next, a predetermined number of instructions are prefetched if a "low confidence" branch is fetched in step 200, via step 202. Preferably, the Prefetch Request Determination Logic implements step 202. Also, the predetermined number of instructions can be 1, 2, etc. Finally, the prefetched instructions are stored in a prefetch buffer, via step 204.

Preferably the predetermined number of instructions are prefetched in step 202 based on the following conditions:

1) If there is no cache miss and a "low confidence" branch is fetched with taken prediction, then prefetch the predetermined number of sequential lines from the not-taken path.
2) If there is no cache miss and a "low confidence" branch is fetched with not-taken prediction, then prefetch the predetermined number of sequential cache lines from the taken path.
3) If there is a cache miss and a "low confidence" branch is fetched from the missed cache line (after the miss has been serviced), then prefetch a predetermined number of cache lines from the not-taken path and a predetermined number of sequential cache lines from the taken path.
4) If no "low-confidence" branch has been fetched, a traditional prefetching algorithm is used, such as if there is a cache miss for a given cache line, then a predetermined member of next sequential cache lines are prefetched (i.e. an NSA algorithm).

In accordance with the present invention, when the "low confidence" branch is executed, if it turns out to be mispredicted, then the instructions from the actual path of execution will be found in the prefetch buffer based on the prefetching algorithm. These instructions are then forwarded down the pipeline, thus avoiding a cache miss penalty.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for prefetching instructions in a superscalar processor comprising the steps of:
    a) fetching a set of instructions after a branch instruction along a predicted path of the branch instruction where the set of instructions can come from any level of a memory within the processor;
    b) prefetching a predetermined minter of instructions from the other path of the branch instruction, if the branch instruction is a low confidence branch where the predetermined number of instructions can come from any level of the memory; and
    c) storing the predetermined number of instructions in a prefetch buffer, wherein the predetermined number of instructions are fetched if the low confidence branch mispredicts.

2. The method of claim 1 wherein step b) further comprises prefetching the predetermined number of instructions from a not-taken path if there is a cache bit and a low confidence branch with taken prediction is fetched in step a).

3. The method of claim 2 wherein step b) further comprises prefetching the predetermined number of instructions from the taken path if there is a cache hit and a low confidence branch with not-taken prediction is fetched in step a).

4. The method of claim 3 wherein step b) farther comprises prefetching the predetermined number of instructions from the taken path and the not-taken path if there is a cache miss and a low confidence branch is fetched in step a).

5. The method of claim 4 wherein if the low confidence branch is mispredicted, a line of instructions is brought in from the prefetch buffer, whereby a cache miss latency is avoided.

6. The method of claim 5 wherein two branch history tables and a branch selector mechanism are utilized to determine the predicted path.

7. The method of claim 6 wherein Prefetch Request Determination Logic is utilized to implement step b).

8. A system for prefetching instructions in a superscalar processor comprising:
    a cache for fetching a set of instructions after a branch instruction along a predicted path of the branch instruction, where the set of instructions can come from any level of a memory within the processor;
    a prefetching mechanism coupled to the cache for prefetching a predetermined number of instructions from the other path of the branch instruction if the branch instruction is a low confidence branch, where the predetermined number of instructions can come from any level of the memory; and
    a prefetch buffer coupled tote prefetching mechanism for storing the predetermined number of instructions, wherein the predetermined number of instructions are fetched if the low confidence branch mispredicts.

9. The system of claim 8 wherein the prefetching mechanism prefetches the predetermined number of instructions from a not-taken path if there is a cache hit and a low confidence branch with taken prediction is fetched byte cache.

10. The system of claim 9 wherein the prefetching mechanism prefetches the predetermined number of instructions from the taken path if there is a cache hit and a low confidence branch with not-taken prediction is fetched by the cache.

11. The system 10 wherein the prefetching mechanism prefetches the predetermined number of instructions from the taken path and the not-taken path if there is a cache miss and a low confidence branch is fetched by the cache.

12. The system of claim 11 wherein if the low confidence branch is mispredicted, a line of instructions is brought in from the prefetch buffer, whereby a cache miss latency is avoided.

13. The system of claim 12 wherein two branch history tables and a branch selector mechanism are utilized to determine the predicted path.

14. The system of claim 13 wherein the prefetch mechanism comprises Prefetch Request Determination Logic.

15. A computer readable medium containing program instructions for prefetching instructions in a superscalar processor, the program instructions comprising the steps of:

a) fetching a set of instructions after a branch instruction along a predicted path of the branch instruction, where the set of instructions can come from any level of a memory within the processor;

b) prefetching a predetermined number of instructions from the other path of the branch instruction, if the branch instruction is a low confidence branch, where the predetermined number of instructions can come from any level of the memory; and c) storing the predetermined number of instructions in a prefetch buffer, wherein the predetermined number of instructions are fetched if the low confidence branch mispredicts.

16. The computer readable medium of claim 15 wherein step b) further comprises prefetching the predetermined number of instructions from a not-taken path if there is a cache hit and a low confidence branch with taken prediction is fetched in step a).

17. The computer readable medium of claim 16 wherein step b) further comprises prefetching the predetermined number of instructions from the taken path if there is a cache hit and a low confidence branch with not-taken prediction is fetched in step a).

18. The computer readable medium of claim 17 wherein step b) further comprises prefetching the predetermined number of instructions from the taken path and the not-taken path if there is a cache miss ends low confidence branch is fetched in step a).

19. The computer readable medium of claim 18 wherein if the low confidence branch is mispredicted, a line of instructions is brought in from the prefetch buffet, whereby a cache miss latency is avoided.

20. The computer readable medium of claim 19 wherein two branch history tables and a branch selector mechanism are utilized to determine the predicted path.

21. The computer readable medium of claim 20 wherein Prefetch Request Determination Logic is utilized to implement step b).

* * * * *

UNITED STATES PATENT AND TRADEMARK OFFICE
CERTIFICATE OF CORRECTION

PATENT NO. : 6,766,441 B2
DATED : July 20, 2004
INVENTOR(S) : Balaram Sinharoy

It is certified that error appears in the above-identified patent and that said Letters Patent is hereby corrected as shown below:

<u>Column 8,</u>
Line 20, remove "minter" and replace with -- number --.
Line 38, remove "farther" and replace with -- further --.
Line 64, remove "tote" and replace with -- to the --.

<u>Column 9,</u>
Line 4, remove "byte" and replace with -- by the --.

<u>Column 10,</u>
Line 20, remove "ends" and replace with -- and a --.
Line 24, remove "buffet" and replace with -- buffer --.

Signed and Sealed this

Twenty-second Day of March, 2005

JON W. DUDAS
*Director of the United States Patent and Trademark Office*